United States Patent

[11] 3,586,287

| [72] | Inventor | Max Knobel<br>453 Beacon Street, Boston, Mass. 02115 |
|---|---|---|
| [21] | Appl. No. | 815,456 |
| [22] | Filed | Apr. 11, 1969 |
| [45] | Patented | June 22, 1971 |

[54] ELECTROPNEUMATIC VALVE
6 Claims, 4 Drawing Figs.

[52] U.S. Cl. ................................................. 251/24, 251/139, 251/141
[51] Int. Cl. ........................................................ F16k 31/06
[50] Field of Search .......................................... 251/24, 139, 141

[56] References Cited
UNITED STATES PATENTS

| 1,911,618 | 5/1933 | Hapgood | 251/139 X |
| 2,435,162 | 1/1948 | Scott, Jr. | 251/24 X |
| 3,289,905 | 12/1966 | Pitt et al. | 251/141 X |
| 3,498,330 | 3/1970 | Paige | 251/141 X |

*Primary Examiner*—Arnold Rosenthal
*Attorney*—Morse, Altman & Oates

ABSTRACT: A small, high-speed, low-power electropneumatic valve is provided for various control applications. An electrical coil is provided with concentric passages extending axially therethrough. A magnetically responsive flapper member is positioned at the discharge end of one of the passages and air flowing through the one passage and out the discharge end normally produces a vacuum in the other passage. Upon energization of the coil the member is closed so as to produce pressure in both passages. The second passage may be operatively connected to a pressure responsive device such as an air-actuated valve or the like.

INVENTOR.
MAX KNOBEL

BY Morse, Altman + Oates

ATTORNEYS

ELECTROPNEUMATIC VALVE

BACKGROUND OF THE INVENTION

1. Field of the Invention

This invention relates generally to electropneumatic valves and more particularly is directed towards a compact, low-power, high-speed, electromagnetic valve suitable for various control applications.

2. History of the Prior Art

Various types of solenoid-actuated valves have been available for some time and for various purposes. However, available valves of this type generally have been rather large in size and have rather high wattage ratings. For example, solenoid-operated valves currently available operate on 10 to 15 watts, on the average, with a few available which operate in the neighborhood of 7 watts. Even the smaller of these values have limited application by reason of their relatively large sizes and also by reason of the heat generated by the current required to operate their coils. As such, valves currently available are not particularly adaptable as components for fluidic system and the like.

Accordingly, it is an object of the present invention to provide improvements in electromagnetic valves and more particularly to provide a small, high-speed electropneumatic valve operable at extremely low wattage, on the order of one-tenth to two-tenths of a watt. Another object of this invention is to provide an electropneumatic valve adapted to switch rapidly from a pressure to a vacuum output for various control purposes.

SUMMARY OF THE INVENTION

This invention features an electropneumatic valve comprising a coil having a magnetically responsive flapper member disposed across one end thereof. A pair of concentric conduits extend coaxially through the coil, one of the conduits extends into closely spaced relation to the flapper member while the other conduit terminates near the end of the first conduit. The first conduit is blocked at its opposite end so that air delivered through the first conduit will normally escape through the flapper end and will cause a vacuum in the second conduit. When the flapper is closed pressure will develop in the second conduit. The second conduit may be employed for various control purposes such as connection to a pressure-responsive valve or the like.

DETAILED DESCRIPTION OF THE PREFERRED EMBODIMENTS

Figure 1:
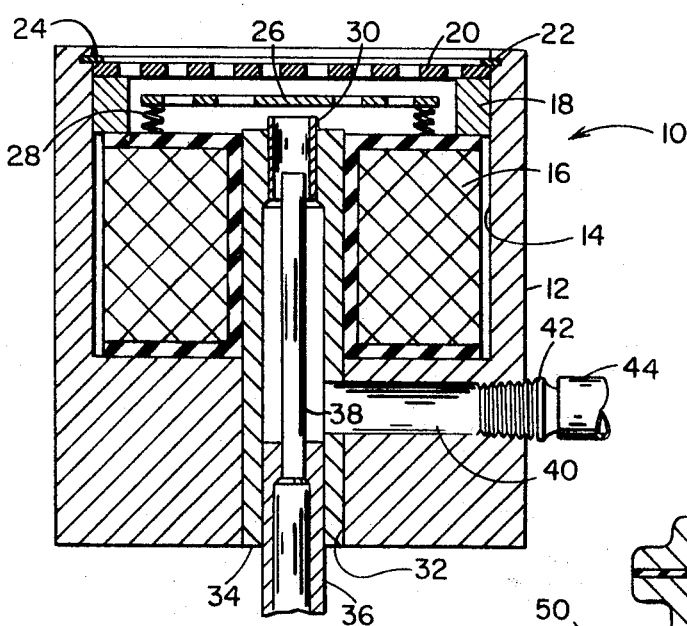
FIG. 1 is a sectional view in side elevation of an electropneumatic valve made according to the invention.

Referring now to FIG. 1, the reference character 10 generally indicates an electropneumatic valve having a cylindrical body portion 12 formed with a central cavity 14 in which is mounted a coil 16. Mounted above the coil 16 is an annular spacer 18 engaging a perforated circular diaphragm 20. The diaphragm 20 is held in position by means of a snap ring 22 seated in an annular groove 24 formed in the upper margin of the cavity walls.

Mounted in the cylindrical chamber formed by the spacer 18 is a flapper member 26 of circular configuration and preferably perforated to facilitate airflow when the valve is open. The valve is relatively large and is supported in a normally raised open position by means of light spring 28. The central portion of the valve is imperforate and is adapted to close against the discharge end of a tube 30 when the member 26 is in a down position. The member 26 is fabricated from magnetically responsive material whereby energization of the coil 16 will cause the valve to be drawn downward so as to close the tube 30. Deenergization of the coil 16 will cause the valve to open under the action of the springs 28.

The body portion 12 is also formed with an axial opening 32 in which is mounted a sleeve 34 extending from the bottom of the body portion 12 to the upper edge of the coil. The upper end of the sleeve 34 carries the tube 30 while the lower end carries a bushing 36. Mounted to the bushing 36 extending coaxially through the sleeve and in spaced relation to the walls thereof is another tube 38. The tube 38 extends through the sleeve up into the tube 30 terminating at a distance from the upper end of the tube 30, typically on the order of several times the diameter of the tube 38. The tube 38 and the sleeve 34 define a pair of passages concentric and coaxial with the coil 16, the outer or sleeve passage being blocked at its lower end by means of the bushing 36 with the upper end being normally open to the tube 30. The passage provided by the tube 38 is open at both ends.

Formed perpendicularly to the coil axis is an air inlet passage 40 which, at its inner end, communicates with the sleeve passage and at the outer end is provided with a coupling 42 connected by means of a conduit 44 to a source of compressed air or other gas.

When air is delivered through the passage 40 under pressure it will flow upwardly through the annular sleeve passage and, when the valve is open, will escape out through the tube 30. The flow of air past the upper tip of the tube 38 will reduce the pressure within the tube 38, creating at least a partial vacuum therein. However, when the coil 16 is energized the member 26 will close the tube 30 and the vacuum in the tube 38 will immediately change to pressure since the flow of air will redirect itself down through the tube 38. The member 26 will act as an armature and will be drawn into contact with the discharge orifice of the tube 30 thus causing a substantial rise in pressure in the tube 38. When the coil is deenergized the pressurized air in the sleeve passage will blow the member 26 away from the end of the tube and maintain it in spaced relation to provide a much lower pressure in the tube 38 and hence in any conduit connected to this tube and leading to a pressure-responsive device or the like.

In a specific embodiment of the invention an electropneumatic valve has been fabricated with an outer diameter of three-fourths of an inch and a length of only 1 inch. The device requires only a few tenths of a watt to operate. This size and power is, of course, far less than that of conventional valves for performing the same function. The body portion 12 not only performs the valve function described but also serves as the core for the coil. In this connection at least a portion of the valve body 12 and sleeve 34 are fabricated of ferromagnetic material. The tube 30 may be of nonmagnetic stainless steel, for example, to prevent the light armature from being stuck down due to residual magnetism.

Figure 2:
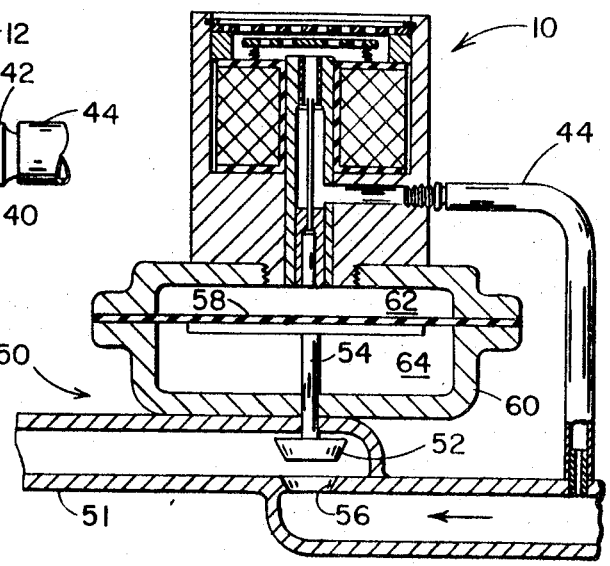
FIG. 2 is a view similar to FIG. 1 but showing the device employed as a pilot valve for a pressure-responsive valve.
Figure 3:
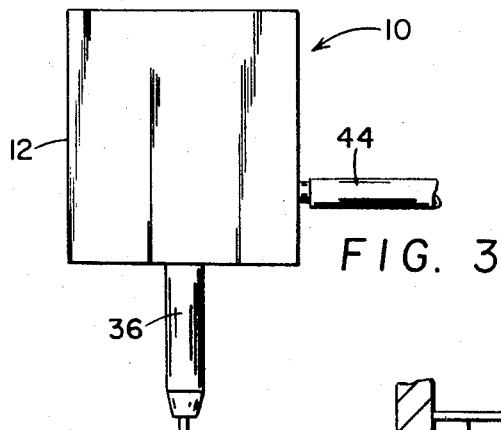
FIG. 3 is a view in side elevation of the valve, and, FIG. 4 is a detail sectional view in side elevation showing a modification of the invention.

Referring now to FIG. 2 the electropneumatic valve 10 of FIG. 1 is shown in use as a pilot valve for a pressure-responsive valve 50 connected to a conduit 51 through which a fluid such as air is flowing. The valve 50 includes a valve disc 52 mounted on the end of a stem 54 adapted to be reciprocated so as to open and close a valve opening 56. The upper end of the stem 54 is connected to the lower chambers 62 and 64 respectively. The upper chamber 62 communicates with the tube 38 of the electropneumatic valve 20 whereby changes in pressure in the tube 38 will cause the diaphragm 58 to raise or lower the stem 54 thereby opening or closing the valve 52. The electropneumatic valve 10 may be provided with compressed air by connecting the conduit 44 to the delivery side of the conduit 51.

The arrangement of FIG. 2 shows a normally open valve 56 which closes when the coil 16 is energized. The pressure responsive valve can be of the normally closed type which opens on energization of the coil, and, by the same token, the electropneumatic valve can be configured so that current normally will be on to the coil and the flapper member will be normally closed. By stopping the coil current the flapper member will open and air will escape, thus actuating the valve either open or closed as desired. With this latter arrangement air will not normally be bleeding from the system and the sound of escaping air will not be present except when the valve is operated.

Figure 4:
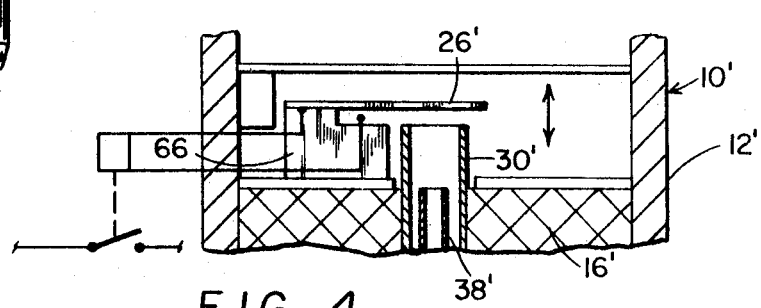

Referring now to FIG. 4 there is illustrated a modification of the invention and in this embodiment a flapper member 26' is connected to a relay 66 whereby when the coil 16' is energized the member 26' will close a tube 30' at the same time changing the pressure within a tube 38' and actuating the relay 66. The relay 66 is of conventional design comprised of switch contacts closed by a downward movement of the flapper 26' closing a circuit to a functional electrical device such as a coil adapted to perform some specified function such as closing another pair of contacts.

Having thus described the invention what I claim and desire to obtain by Letters Patent of the United States is:

1. An electropneumatic valve, comprising
 a. a coil,
 b. an armature disposed at one end of said coil and movable towards said coil upon energization of said coil;
 c. first and second conduits extending concentrically along the axis of said coil,
 d. said first conduit extending beyond said second conduit and the end of said first conduit in position to be closed by said armature upon energization of said coil,
 e. means for delivering a flow of gas to said first conduit for discharge from the end thereof when said armature is open and thereby produce a negative pressure in said second conduit,
 f. energization of said coil causing said armature to close said first conduit and causing an increase in pressure in said second conduit.

2. A electropneumatic valve according to claim 1 including spring means urging said armature in a normally open position.

3. An electropneumatic valve according to claim 1 in combination with a pressure-responsive valve operatively connected to said second conduit.

4. An electropneumatic valve according to claim 1 including a relay operatively connected to said armature.

5. A control device comprising,
 a. a housing,
 b. an electromagnet coil within said housing,
 c. a coil core for said coil including a member disposed coaxially within the coil,
 d. said member having an internal passage opening at one end outwardly of one end of said member,
 e. a conduit disposed coaxially of said internal passage with at least a portion of said conduit disposed within said passage in radially spaced relation,
 f. the end of said conduit closer to said one end of said passage being spaced therefrom a distance equal to several times the diameter of the conduit,
 g. means providing a pressurized air inlet passage communicating with the space between said internal passage and conduit,
 h. the other end of said conduit communicating outwardly of said body, and
 i. an armature for said coil comprising a member extending across said one end of said internal passage,
 j. said armature being movable toward and away from said coil in response to energizing and deenergizing respectively of the coil,
 k. said armature having a portion cooperable with said one end of said internal passage to close the same when the armature is drawn toward the coil in response to energizing of the coil.

6. In a device as claimed in claim 5, said armature being sufficiently light that when pressurized air is introduced into said inlet passage and said coil is deenergized the armature will be supported in spaced relation to said body discharging from said one end of said internal passage, and a foraminate cover on said housing retaining said armature in the housing.

6. In a device as claimed in claim 5, said armature being sufficiently light that when pressurized air is introduced into said inlet passage and said coil is deenergized the armature will be supported in spaced relation to said body by the air discharging from said one end of said internal passage, and a forminating cover on said housing retaining said armature in the housing.